(12) United States Patent
Dubrovsky et al.

(10) Patent No.: US 12,732,431 B2
(45) Date of Patent: Sep. 8, 2026

(54) PATH SELECTION OF EDGE DEVICES IN DISTRIBUTED ENVIRONMENTS

(71) Applicant: Dell Products L.P., Round Rock, TX (US)

(72) Inventors: Igor Dubrovsky, Beer Sheva (IL); Boris Shpilyuck, Ashdod (IL); Maxim Balin, Gan-Yavne (IL); Nisan Haimov, Beer Sheva (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/901,143

(22) Filed: Sep. 30, 2024

(65) Prior Publication Data

US 2026/0095377 A1 Apr. 2, 2026

(51) Int. Cl.
*H04L 41/12* (2022.01)
*H04L 43/0817* (2022.01)

(52) U.S. Cl.
CPC .......... *H04L 41/12* (2013.01); *H04L 43/0817* (2013.01)

(58) Field of Classification Search
CPC ............................ H04L 41/12; H04L 43/0817
USPC ........................................................ 709/224
See application file for complete search history.

(56) References Cited

U.S. PATENT DOCUMENTS 9,178,807 B1 * 11/2015 Chua ........................ H04L 45/22
9,762,537 B1 * 9/2017 Eyada ................. H04L 63/1408
10,484,925 B1 * 11/2019 Chen ..................... H04W 40/16
11,245,614 B1 * 2/2022 Backes ................... H04L 45/76
2010/0260177 A1 * 10/2010 Wu ......................... H04L 45/04 370/389
2023/0269172 A1 * 8/2023 Ramanathan ........... H04L 45/70 709/227
2024/0406276 A1 * 12/2024 Mahadevan ............ H04L 45/28
2025/0106151 A1 * 3/2025 Satyanarayana ........ H04L 47/29

* cited by examiner

*Primary Examiner* — David P Zarka
(74) *Attorney, Agent, or Firm* — WOMBLE BOND DICKINSON (US) LLP

(57) ABSTRACT

Methods and systems for managing operation of a deployment are disclosed. The operation may be managed by generating at least one filtered path map of edge devices, the edge devices being used for a request for performance of a service. The at least one filtered path map of the edge devices may be generated by filtering a path map of participant edge devices that have a healthy health states. An edge device health status map may be generated to include health states of the edge devices and may be used in the determination. Also, a request participant edge device paths map may be generated to include at least one edge device that participates in the request and may also be used in the determination.

20 Claims, 9 Drawing Sheets

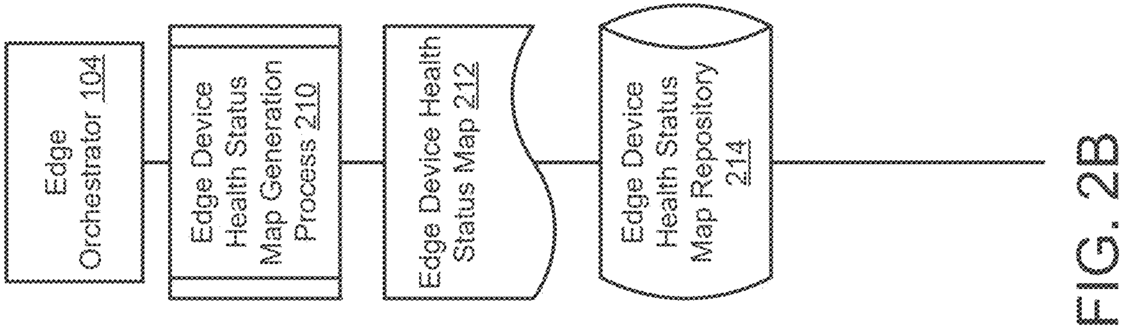
FIG. 2B
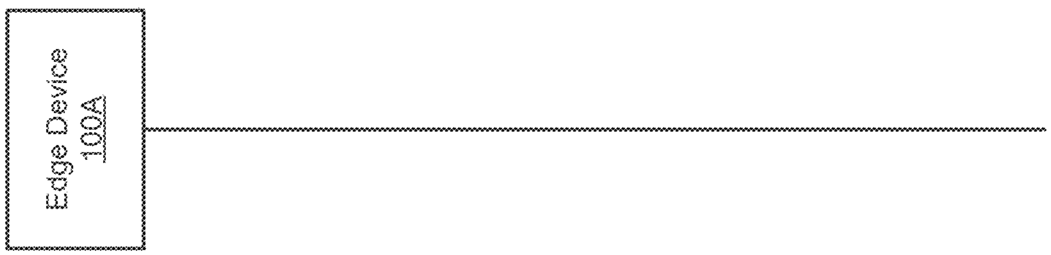
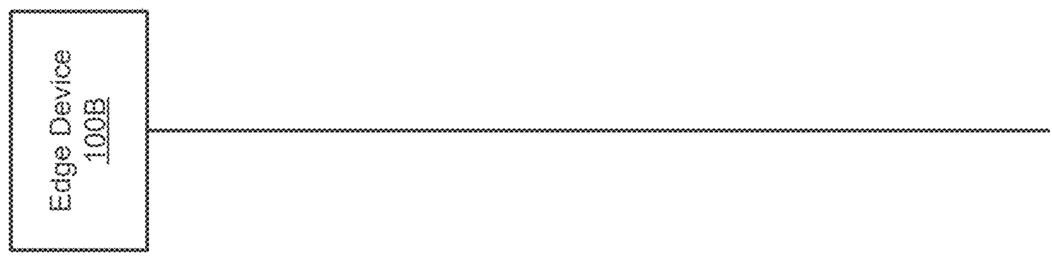

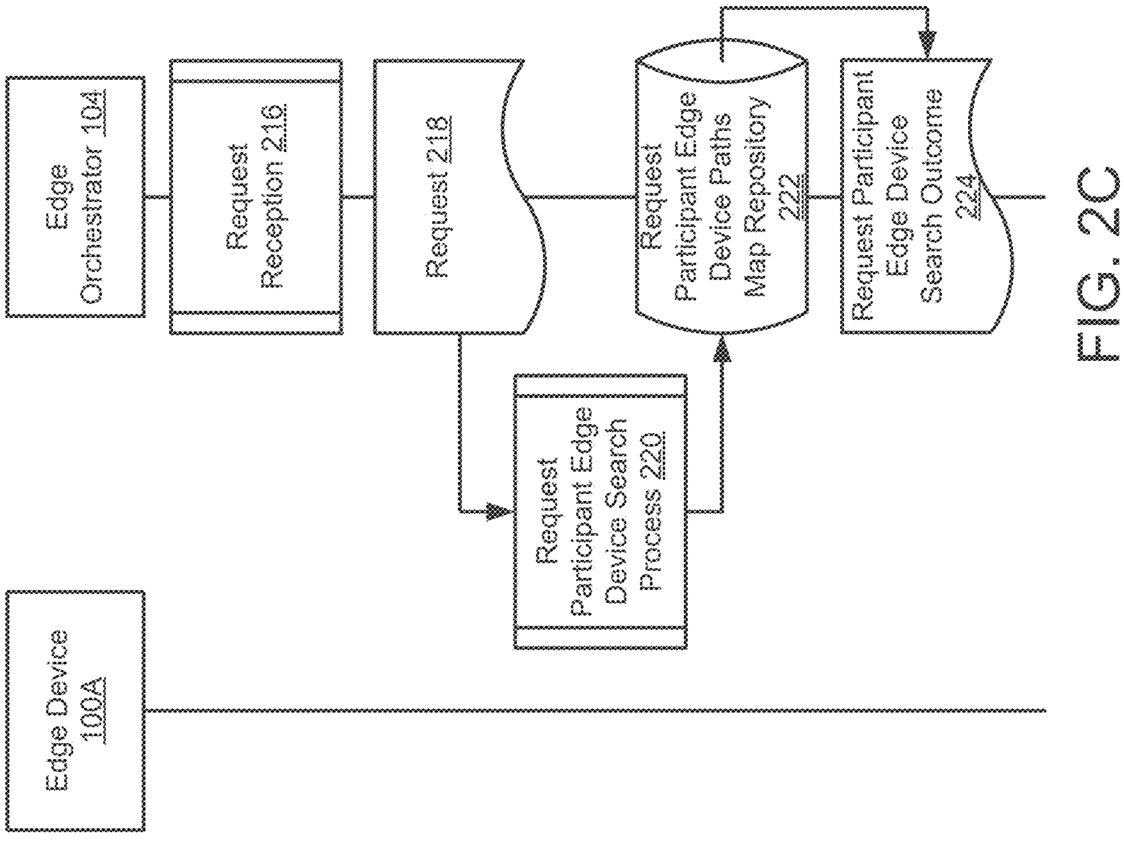
FIG. 2C

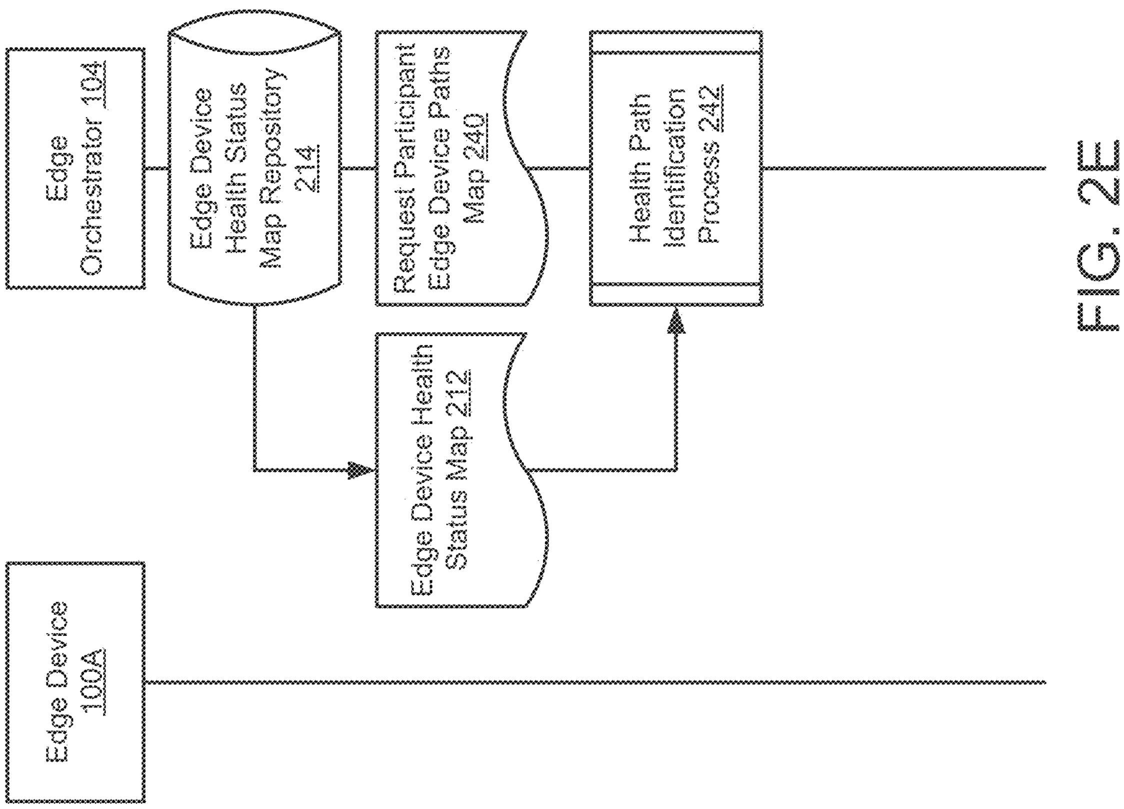
Edge Orchestrator 104
Edge Device Health Status Map Repository 214
Request Participant Edge Device Paths Map 240
Health Path Identification Process 242
Edge Device Health Status Map 212
Edge Device 100A
FIG. 2E
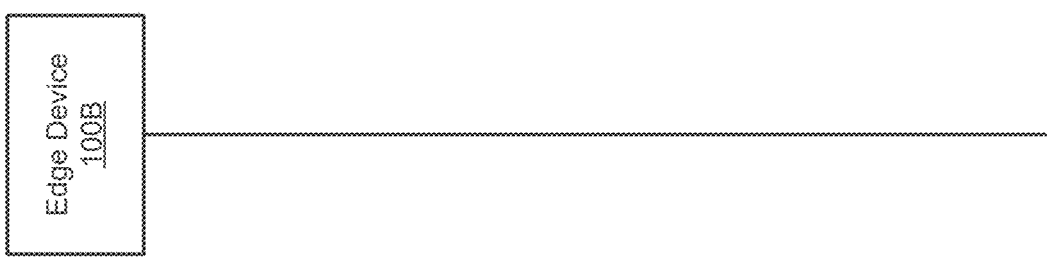
Edge Device 100B

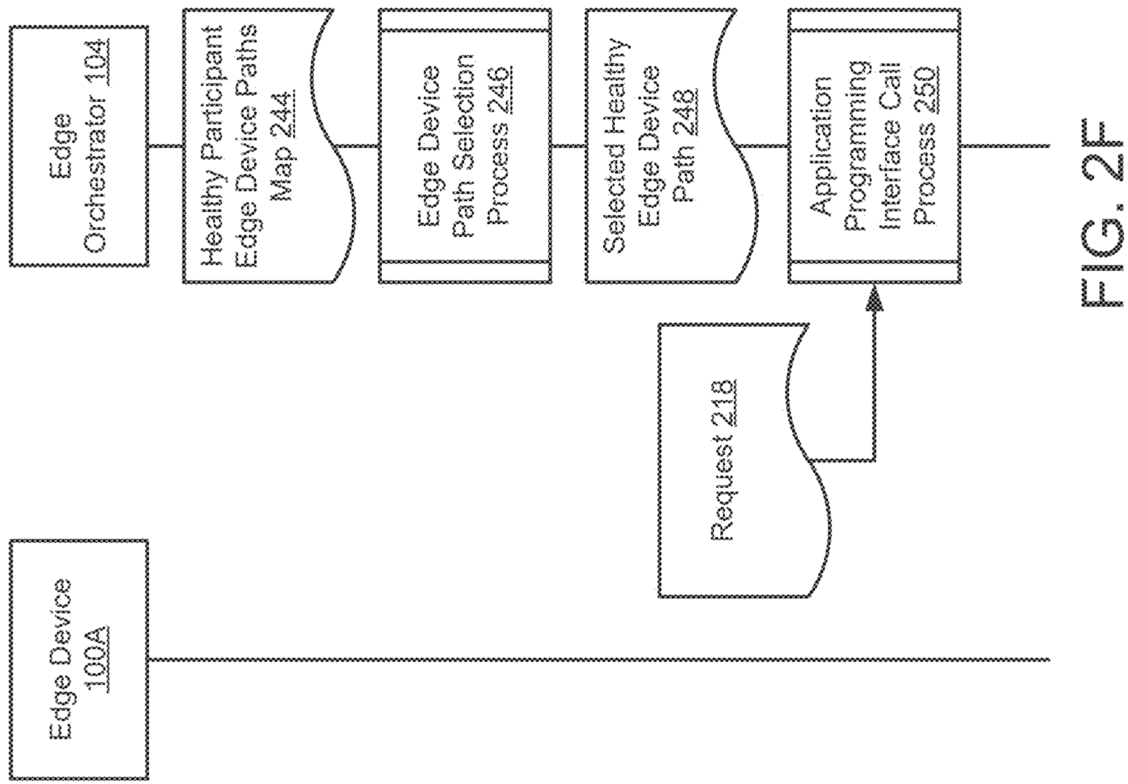
FIG. 2F
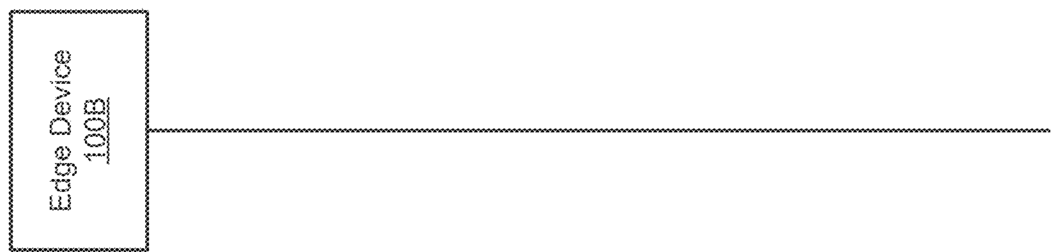

PATH SELECTION OF EDGE DEVICES IN DISTRIBUTED ENVIRONMENTS

FIELD

Embodiments disclosed herein relate generally to managing operation of a deployment. More particularly, embodiments disclosed herein relate to selecting edge devices in a distributed environment for performance of a service.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIGS. 2A-2F show interaction diagrams illustrating operation of a system in accordance with an embodiment.

DETAILED DESCRIPTION

Figure 1:
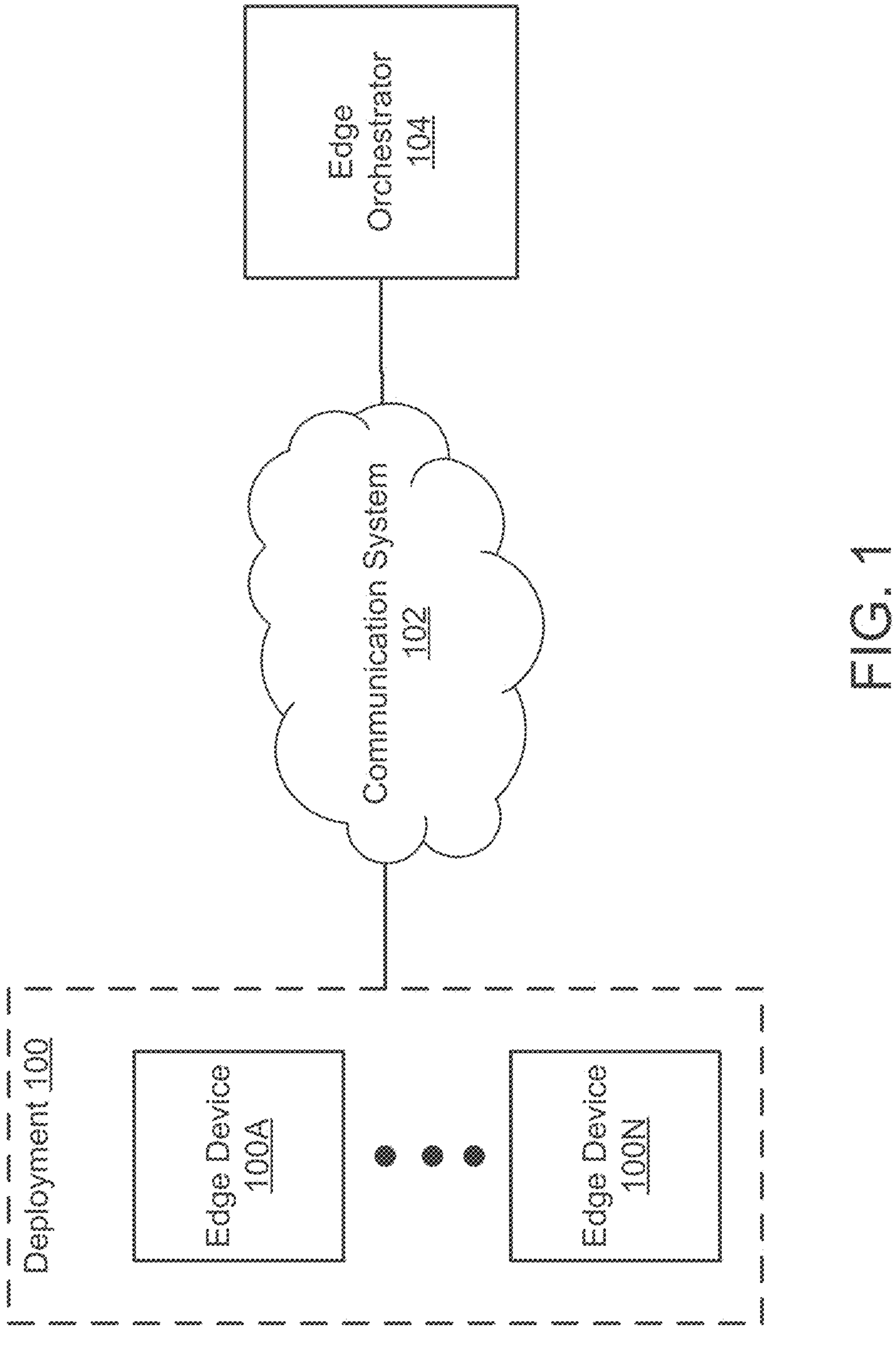
FIG. 1 shows a diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to managing operation of a deployment. The operation may be managed by making a selection of edge devices in a distributed environment for performance of a service. The selection may include a path of edge devices that are connected through which the service is performed.

To make the selection, health states of the edge devices may be reported. The health states may be reported periodically and/or when at least one health state of an at least one edge device changes. Using the at least one health state of the at least one edge device, an edge device health state map may be generated and stored in a repository.

In addition, a request for the performance of the service may be received. To ensure the performance of the service, a query may be performed for participant edge devices that perform the service. The query may be performed by searching a repository of participant edge device maps. If at least one participant edge device map is not found that can perform the service, the at least one participant edge device map may be generated. The at least one participant edge device map may be generated by (i) invoking the performance of the service to obtain an identifier of the at least one participant edge device and (ii) generating, based on an identifier of the at least one participant edge device, a participant edge device paths map that includes the participant edge devices.

Using a participant edge device paths map and edge device health state map, a healthy participant edge device paths map may be generated. The healthy participant edge device paths map may be generated by checking a health state of an edge device, using the edge device health state map, on the participant edge device paths map. If the edge device has a healthy health state, then the edge device may be included in the healthy participant edge device paths. Otherwise, if the edge device has an unhealthy health state, then the participant edge device paths map may be discarded.

From the healthy participant edge device paths map, one path of the edge devices may be selected for the performance of the service. The one path may be selected based performance criteria. Once selected, the one path of the edge devices may be used to perform the service.

In an embodiment, a method for managing operation of a deployment is disclosed. The method may include: (i) obtaining a request for performance of a service by edge devices of the deployment, (ii) attempting to identify at least one path map for the service, (iii) in a first instance of the attempting where no path maps are available for the service: (a) establishing a new path map for the service, (iv) in a second instance of the attempting where the at least one path map for the service is available: (a) filtering the at least one path map using health states of the edge devices to obtain at least one filtered path map, (b) selecting one of the at least one filtered path maps, and (c) initiating performance of the service by issuing a command based on the selected one of the at least one filtered path maps to provide a desired computer implemented service using the deployment.

The method may further include obtaining a health state of the health states from an edge device of the edge devices.

Attempting to identify the at least one path map for the service may include performing a search in a repository for the at least one path map through which the command, based on the request, may be performed.

The at least one path map may be added to the repository after the at least one path map is established and the repository is used to store the at least one path map.

The at least one path map may identify a set of edge devices that can participate in the command, from a first edge device to a second edge device, based on the request for performance of the service.

Establishing the new path map for the service may include: (a) performing the request, the request being passed to at least one edge device of the edge devices, the request comprising an instruction for the performance of the service and a trace identifier, (b) obtaining a response from the trace identifier to identify the at least one edge device, and (c) generating the new path map for the service using the identification of the at least one edge device.

Filtering the at least one path map using the health states of the edge devices may include, for an edge device of the at least one path map: (i) checking whether the edge device of the at least one path map has an unhealthy health state of the health states, (ii) in the first instance of the checking where the edge device in the at least one path map has an unhealthy health state of the health states: (a) discarding the at least one path map, and (iii) in the second instance of the checking where the edge device on the path does not have an unhealthy health state of the health states: (a) adding the edge device to a filtered path map of the at least one filtered path map.

A health state of the health states may specify an operational status of an edge device of the edge devices, the operational status being an indicator of performance and functionality of the edge device.

The functionality of the edge device may include at least one type of operation by the edge device to process the request.

The performance of the edge device may include how well the edge device can complete the at least one type of the operation to process the request.

The command may include at least one instruction to be completed by an edge device of the edge devices, the at least one instruction causing performance of the service on a distributed system, the at least one instruction being performed on the one of the at least one filtered path maps.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a system in accordance with an embodiment is shown. The system may provide any number and types of computer implemented services (e.g., to user of the system and/or devices operably connected to the system). The computer implemented services may include, for example, data storage service, instant messaging services, etc.

To provide the computer implemented services, a request may be made for performance of a service. The request may be made by an administrator and/or software from a data processing system. The service may be performed by invoking an instruction on at least one edge device. The at least one or more edge device may include a distributed environment of edge devices that transfer the instruction through a path of the at least one or more edge device.

On routing though the path of the edge devices, the instruction may encounter an edge device that has an unhealthy health status and/or a connectivity problem with the edge devices. The unhealthy health status and/or the connectivity problem may restrict further invocation of the instruction through the distributed environment of the edge devices. As a result of the restriction, the performance of the service by the edge devices may be impacted and/or may fail.

In general, embodiments disclosed here relate to systems and methods for managing operation of a deployment. The operation may be managed by (i) generating at least one filtered path map of healthy edge devices through which a service may be performed and (ii) selecting one filtered path map of the at least one filtered path map for performance of the service.

To generate the at least one filtered path map, (i) health states of edge devices may be acquired from a deployment of the edge devices, (ii) at least one path map of participant edge devices of a request for the performance of the service may be acquired, and (iii) the at least one filtered path map may be generated by filtering unhealthy participant edge devices from the participant edge devices.

The health states of the edge devices may be acquired may receiving, from the edge devices, health status updates of the edge devices. The health status updates may be received periodically and/or when the health status of an edge device changes. The health status updates may be stored in a repository of the health status updates.

The at least one path map of the participant edge devices of the request may be obtained by checking in a request participant edge device map repository whether the at least one path map is available. If the at least one path map is available, the at least one path map may be selected.

If the at least one path map is not available, the at least one path may be generated. The at least one path map may be generated by performing the request with at least one edge device. To perform the request, an instruction may be invoked on the at least one edge device. The instruction may include a trace identifier. During the performance of the request, the instruction may be passed through a chain of the participant edge devices in a network of edge devices. For a participant edge device along the chain of the participant edge devices, the trace identifier may obtain a participant edge device identifier. The participant edge device identifier may be received from the participant edge device. Trace identifiers from the participant edge devices may be used to generate the at least one path map by mapping the path of the participant edge devices through which the instruction was propagated.

The at least one filtered path map may be generated by filtering unhealthy participant edge devices from the participant edge devices in the at least one path map. For each of the participant edge devices in the at least one path map, the health status of the participant edge devices may be obtained from the repository of the health status updates. If the participant edge device in the at least one path map has an unhealthy health status, the at least one path map may be discarded. Otherwise, if the participant edge device in the at least one path map has a healthy health status, then the participant edge device may be added to the at least one filtered path map.

One filtered path map of the at least one filtered path map may be selected by evaluating a set of criteria of the at least one filtered path map. The criteria may include (i) functionality (e.g. an availability of tools on the edge devices in the one filtered path map to process the request), (ii) performance (e.g., how much data can be handled by the edge devices in the one filtered path map, time required to process the request, an ability by the edge devices to scale with increasing data loads), (iii) reliability (e.g., an ability of the edge devices in the one filtered path map to operate continuously without failure and an inclusion of data backup procedures in the event of the failure), etc.

Finally, upon selection of the one filtered path map, the performance of the service may be initiated by issuing a command based on the request. The command may include at least one instruction to be performed by edge devices of the one filtered path map. By performing the instruction, desired computer implemented services may be provided by the deployment.

To provide the above noted functionality, the system may include deployment 100, and edge orchestrator 104. Each of these components is discussed below.

Deployment 100 may include any number of edge device 100A-100N. The any number of edge device 100A-100N may include a distributed environment of edge devices that can perform an instruction from a command based on a request. In the performance of the instruction, the any number of edge device 100A-100N may also transfer the instruction to the any number of edge device 100A-100N. Effectively, the instruction may be propagated through the distributed environment of the any number of edge device 100A-100N. An efficacy of the propagation may depend on (i) a health status of the any number of edge device 100A-100N and (ii) connectivity between the any number of edge device 100A-100N. Thus, to ensure the efficacy of the propagation of the instruction, the health status of the any number of edge device 100A-100N may be reported to edge orchestrator 104 periodically and/or when the health status and/or the connectivity changes.

Edge orchestrator 104 may receive the request for performance of the service. To complete the request, edge orchestrator 104 may first identify at least one path map of participant edge devices from a repository of request participant edge device maps. If the at least one path map is not available, edge orchestrator 104 may generate the at least one path map. The at least one path map may be generated by performing the request on the any number of edge device 100A-100N. A trace identifier may be included in the request. As the request is propagated through at least one path of the any number of edge device 100A-100N, the trace identifier may return a participant edge device identifier to edge orchestrator 104.

The participant edge identifier may be used to generate the at least one path map. The at least one path map may identify a sequence of edge devices through which a request is propagated. Edge orchestrator 104 may generate at least one filtered path map by filtering unhealthy participant edge devices from participant edge devices in the at least one path map. For each of the participant edge devices in the at least one path map, edge orchestrator 104 may obtain the health status of the participant edge devices from a repository of the health status updates. If the participant edge device in the at least one path map has an unhealthy health status, the at least one path map may be discarded. Otherwise, if the participant edge device in the at least one path map has a healthy health status, then edge orchestrator 104 may add the participant edge device to the at least one filtered path map.

From the at least one filtered path map, edge orchestrator 104 may select a one filtered path map for performance of the service. Edge orchestrator 104 may select the one filtered path map based on a set of criteria. The criteria may include (i) functionality (e.g. an availability of tools on the any number of edge device 100A-100N in the filtered path map to process the request), (ii) performance (e.g., how much data can be handled by the any number of edge device 100A-100N in the filtered path map, time required to process the request, an ability by the edge devices to scale with increasing data loads), (iii) reliability (e.g., an ability of the edge devices in the one filtered path map to operate continuously without failure and an inclusion of data backup procedures in the event of the failure), etc.

Finally, once edge orchestrator 104 selects the one filtered path map, edge orchestrator 104 may initiate the performance of the service by issuing a command based on the request. The command may include at least one instruction to be completed by the any number of edge device 100A-100N of the one filtered path map.

Figure 2A:
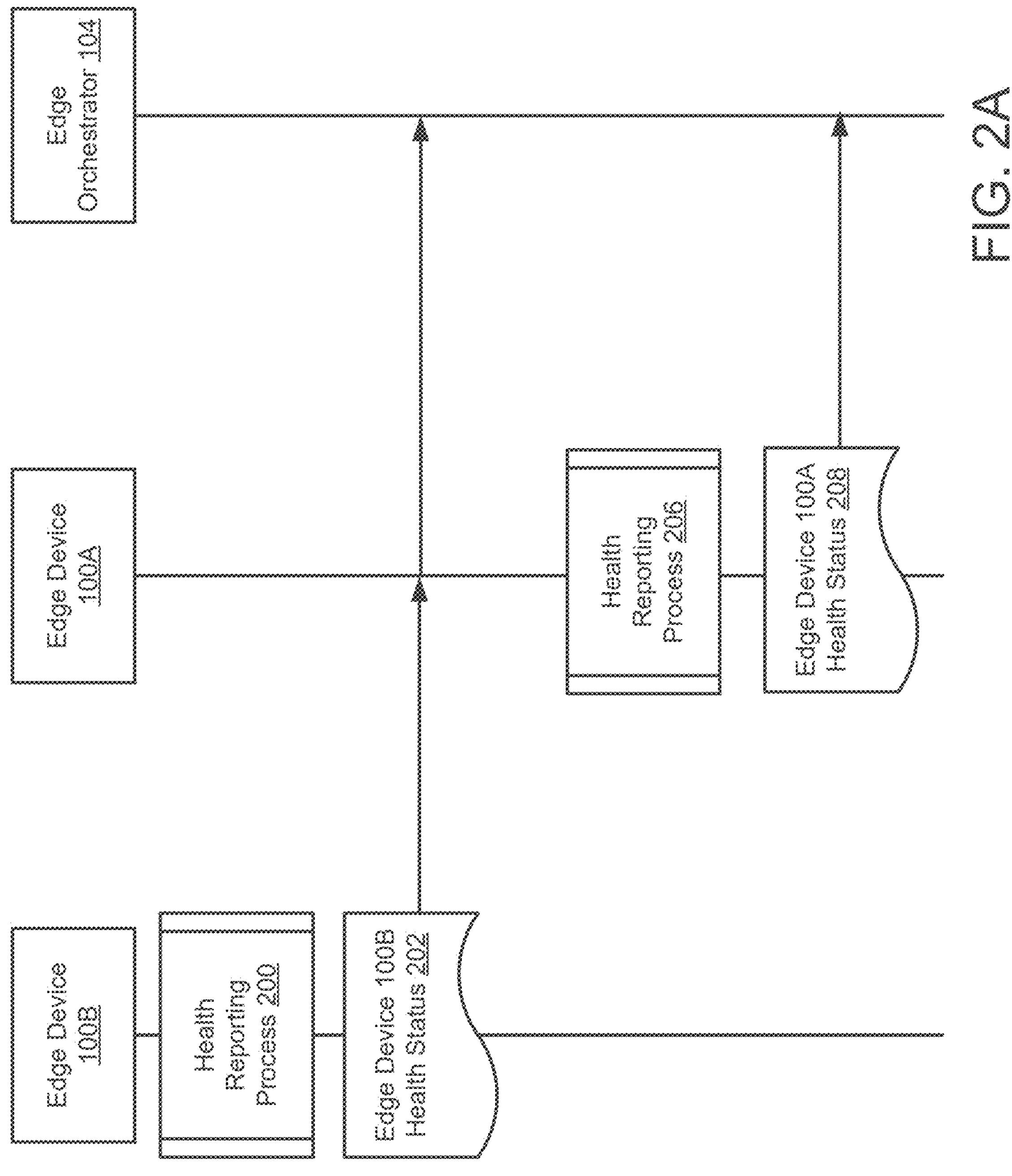
Figure 2D:
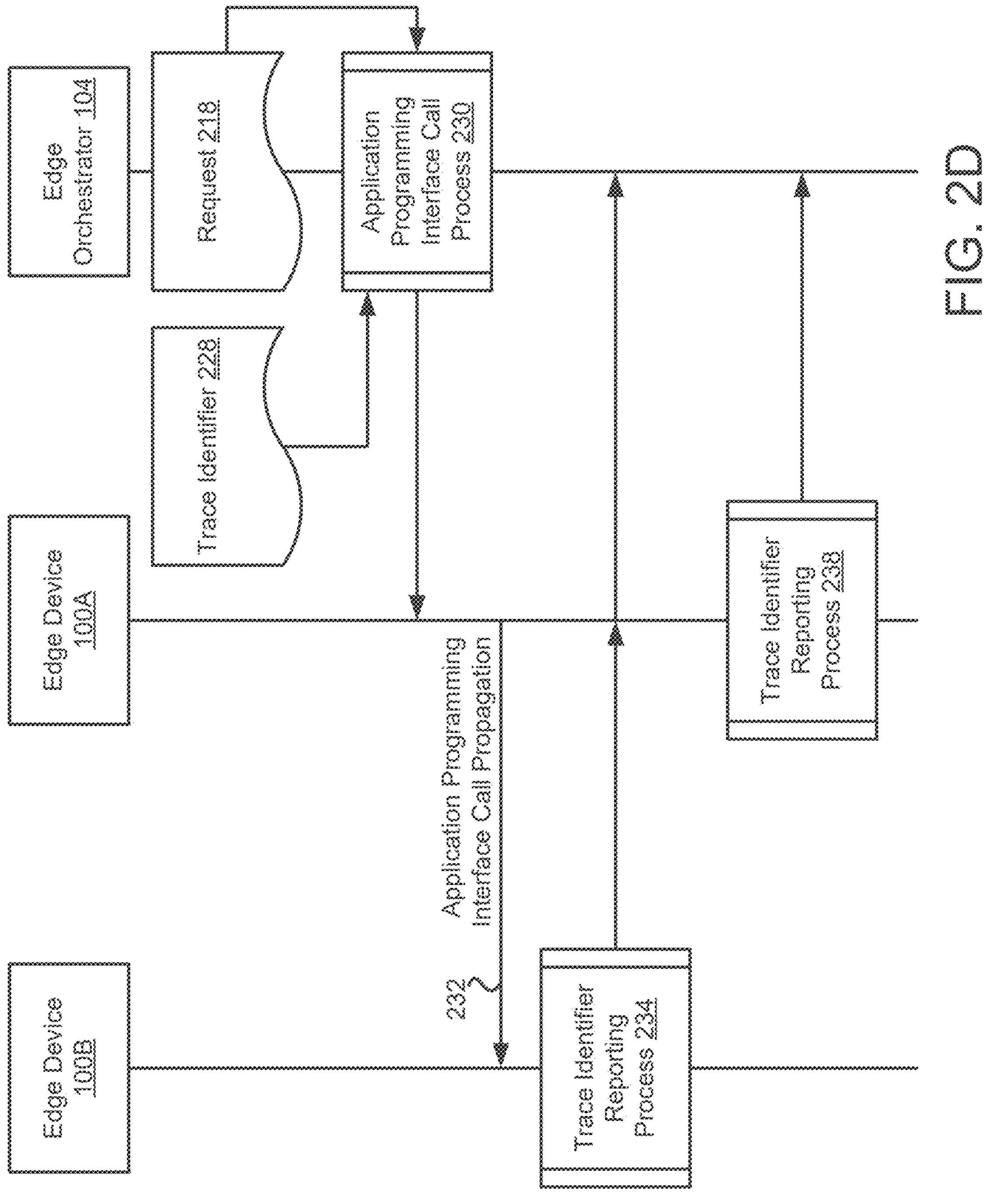
Figure 3:
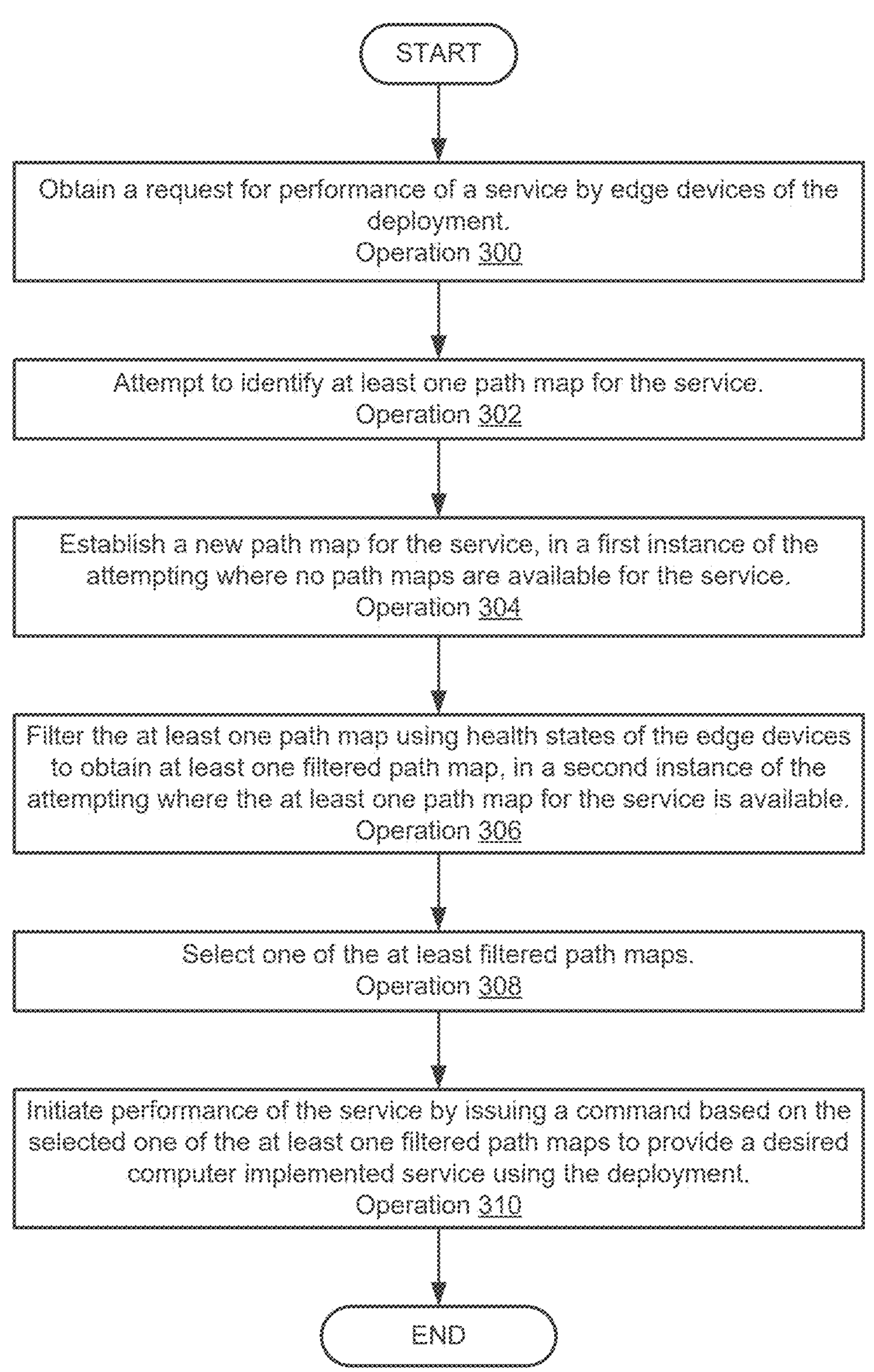
FIG. 3 shows a flow diagram illustrating a method in accordance with an embodiment.

While providing their functionality, any of deployment 100 and edge orchestrator 104 may perform all, or a portion, of the flows and methods shown in FIGS. 2A-3.

Any of (and/or components thereof) deployment 100 and edge orchestrator 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 102. In an embodiment, communication system 102 includes one or more networks that facilitate communication between any number of components. The networks may include wired networks and/or wireless networks (e.g., and/or the Internet). The networks may operate in accordance with any number and types of communication protocols (e.g., such as the Internet protocol).

While illustrated in FIG. 1 as including a limited number of specific components, a system in accordance with an embodiment may include fewer, additional, and/or different components than those components illustrated therein.

To further clarify embodiments disclosed herein, interactions diagrams in accordance with an embodiment are shown in FIGS. 2A-2F. These interactions diagrams may illustrate how data may be obtained and used within the system of FIG. 2A-2F.

In the interaction diagrams, processes performed by and interactions between components of a system in accordance with an embodiment are shown. In the diagrams, components of the system are illustrated using a first set of shapes (e.g., 100A, 100B, etc.), located towards the top of each figure. Lines descend from these shapes. Processes performed by the components of the system are illustrated using a second set of shapes (e.g., 200, 206, etc.) superimposed over these lines. Interactions (e.g., communication, data transmissions, etc.) between the components of the system are illustrated using a third set of shapes (e.g., 232, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the process labeled as 200 may occur prior to the process labeled as 206. However, it will be appreciated that the processes and interactions may be performed in different orders, any may be omitted, and other processes or interactions may be performed without departing from embodiments disclosed herein.

Turning to FIG. 2A, a first interaction diagram in accordance with an embodiment is shown. The first interaction diagram may illustrate data used in and data processing performed in obtaining a health status of at least one edge device in a distributed environment of edge devices.

To obtain the health status of the at least one edge device, health status reporting process 200 may be performed. During health status reporting process 200, at least one of a set of health check processes may be run on edge device 100B. The health check processes may include (i) system monitoring (e.g., tracking of performance metrics including computer processing unit (CPU) usage, memory usage, disk space allocation, network throughput, etc.), (ii) component checks (e.g., verifying components such as databases, microservices, etc.), (iii) error logging (e.g., scanning regularly for errors and/or anomalies within one or more error logs within edge device 100B), etc.

Output from the health check processes may include an indicator that qualifies a health status of edge device 100B. The indicator may be included in edge device 100B health status 202. The indicator may use, for example, a traffic light status, such as green, yellow, red where green means that edge device 100B is performing well, yellow means edge device 100B is experiencing minor issues, and/or red means edge device 100B is experiencing issues. The indicator may use, instead of a qualitative indicator such as green, yellow, and/or red, a quantitative indicator such as a health score. The health score may range from 0 to 100, with higher scores indicating better performance.

Since edge device 100B may be embedded in a distributed environment of edge devices and may not be directly connected with edge orchestrator 104, edge device 100B may transfer edge device 100B health status 202 to edge device 100A. Edge device 100B may transfer edge device 100B health status 202 using a data stream, message queue, shared memory, etc.

Edge device 100A may receive edge device 100B health status 202. Upon receiving edge device 100B health status 202, edge device 100A may transfer edge device 100B health status 202 to edge orchestrator 104. Edge device 100A may transfer edge device 100B health status 202 using a data stream, message queue, shared memory, etc.

Similar to edge device 100B, edge device 100A may perform health status reporting process 206. During health status reporting process 206, at least one of a set of health check processes, similarly performed during health status reporting process 200, may be performed on edge device 100A. The health check processes may be described above in a description of health status reporting process 200.

The output from the health check processes may include the indicator that qualifies the health status of edge device 100B. The indicator may be included in edge device 100A health status 208. The indicator may be similar to the indicator described for edge device 100B health status 202. The indicator may be described above in the description of edge device 100B health status 202.

Upon generating edge device 100A health status 208, edge device 100A may transfer edge device 100A health status 208 to edge orchestrator 104. Edge device 100A may transfer edge device 100A health status 208 using a data stream, message queue, shared memory, etc.

Thus, via the interaction illustrated in FIG. 2A, a system in accordance with an embodiment may obtain the health status of the at least one edge device in the distributed environment of the edge devices. Consequently, a deployment (e.g., 100) may be more likely to be able to provide desired computer implemented services by reporting the health status of the at least one edge device to an edge orchestrator (e.g., 104).

Turning to FIG. 2B, a second interaction diagram in accordance with an embodiment is shown. The second interaction diagram may illustrate data used in and data processing performed in obtaining and storing health status maps of edge devices in a distributed environment of edge devices.

To obtain and store the health status map of the edge devices, edge device health status map generation process 210 may be performed. During edge device health status map generation process 210, at least one health status may be received from at least one edge device. Reception of the health status may be described in the description of FIG. 2A.

The at least one health status of the at least one edge device may be used to generate the edge device health status map. The edge device health status map may be generated by listing a device identifier for each edge device of the at least one edge device with the at least one health status appended, for example, as metadata, for each edge device on the edge device health status map.

Edge device health status map 212 may include the edge device health status map. Edge device health status map 212 may be stored in edge device health status map repository 214. Edge device health status map repository 214 may include at least one health status map for the at least one edge device. Further, the at least one health status map may include a timestamp because the at least one health status may change for any edge device of the at least one edge device at any time. If the at least one health status may change, a new health status map of the at least one health status map may need to be updated.

Thus, via the interaction illustrated in FIG. 2B, a system in accordance with an embodiment may obtain and store the health status map of edge devices in a distributed environment of edge devices. Consequently, a deployment (e.g., 100) may be more likely to be able to provide desired computer implemented services by listing at least one health status of the at least one edge device in the distributed environment.

Turning to FIG. 2C, a third interaction diagram in accordance with an embodiment is shown. The third interaction diagram may illustrate data used in and data processing performed in determining whether at least one edge device participates in a request for performance of a service.

To determine whether the at least one edge device participates in the request, request reception 216 may be performed. During request reception 216, the request may be received by edge orchestrator 104. The request may be received by obtaining the request from a client that has sent the request. The client may include a user, application and/or device.

Request 218 may include a request for the performance of the service. Examples of the service may be (i) accessing and/or updating information, (ii) performing a mathematical operation, (iii) sending a notification (e.g., a message, etc.), etc. Protocols of the request for request 218 may include (i) GraphQL (Graph Query Language) for fetching data with a single query, (ii) gRPC (Remote Procedure Calls) for application programming interface (API) calls for microservice architectures, (iii) MQTT (Message Queuing Telemetry Transport) for lightweight messaging for networks with high latency and/or low bandwidth, etc.

Using request 218, request participant edge device search process 220 may be performed. During request participant edge device search process 220, request participant edge device paths map repository 222 may be queried. Request participant edge device paths map repository 222 may be queried by performing a search for an edge device map.

Request participant edge device paths map repository 222 may include at least one edge device paths map for any number of requests. The at least one edge device paths map may include a list of at least one edge device that performs the service in response to a request (e.g., 218). If an edge device map for a request is not present in request participant edge device paths map repository 222, the edge device map for the request may be (i) generated (as described in the description of FIG. 2D) and (ii) added to request participant edge device paths map repository 222.

After request participant edge device search process 220, request participant edge device search outcome 224 may be determined. Request participant edge device search outcome 224 may be determined by obtaining an outcome of a search of request participant edge device paths map repository 222 for at least one edge device paths map for request 218. If the at least one edge device paths map is not found, then the at least one edge device paths map may need to be generated. However, the at least one edge device paths map is found, then the at least one edge device paths map may be used as described in the description of FIG. 2E.

Thus, via the interaction illustrated in FIG. 2C, a system in accordance with an embodiment may receive the request for the performance of the service and perform the search for the at least one edge device paths map that can perform the service. Consequently, a deployment (e.g., 100) may be more likely to be able to provide desired computer implemented services by attempting to retrieve the at least one edge device map that can fulfill the request.

Turning to FIG. 2D, a fourth interaction diagram in accordance with an embodiment is shown. The fourth interaction diagram may illustrate data used in and data processing performed in generating an edge device paths map.

To generate the edge device paths map, application programming interface call process 230 may be performed. During application programming interface call process 230, an application programming interface (API) call, based on request 218, may be performed on edge device 100A. The API call may be passed by performing a command based on request 218 to be performed by edge device 100A.

Embedded within the API call may be trace identifier 228. Trace identifier 228 may be used to track a journey of the API call through a distributed environment of at least one edge device. When the API call is received by edge device 100A, and the command is run by edge device 100A, trace identifier 228 may trigger a callback to edge orchestrator 104. With the callback to edge orchestrator 104, the device identifier for edge device 100A may be sent to edge orchestrator 104.

To further illustrate application programming interface call process 230, the command based on request 218 may be sent to edge device 100A. Edge device 100A may receive the command and perform the command. Performance of the command may result in a continuation of API call that performed on edge device 100B. The API call may be continued, as shown in interaction 232. Edge device 100B may receive the API call and continue performance of the command. The command may result in at least one continuation of the API call to other edge devices.

During performance of the command, trace identifier reporting process 234 may be performed. During trace identifier reporting process 234, trace identifier 228 may obtain the device identifier of edge device 100B. Trace identifier 228 may obtain the device identifier by performing a search in system files and/or metadata of edge device 100B and recording the device identifier from the search.

Once the unique identifier has been recorded, trace identifier 228 may send a first callback to edge orchestrator 104 from edge device 100B through edge device 100A. Edge orchestrator 104 may receive the first callback from edge device 100B. Edge orchestrator 104 may determine that the first callback was sent through the API call from edge device 100A. Therefore, edge orchestrator 104 may determine that a first path, from the API call, includes a connection from edge orchestrator 104 to edge device 100A to edge device 100B. The first path may be recorded on an edge device paths map.

To add to the first path on the edge device paths map, trace identifier reporting process 238 may be performed. During trace identifier reporting process 238, trace identifier 228 may obtain a second device identifier of edge device 100A. Trace identifier 228 may obtain the second device identifier by performing the search in system files and/or metadata of edge device 100A and recording the second device identifier from the search.

Once the second unique identifier has been recorded, trace identifier 228 may send a second callback to edge orchestrator 104 from edge device 100A. Edge orchestrator 104 may note that the second callback was sent through the API call from edge device 100A. Therefore, edge orchestrator 104 may determine that a second path, from the API call, includes a connection from edge orchestrator 104 to edge device 100A. The second path may be used to confirm a portion of the first path, which includes the connection from edge orchestrator 104 to edge device 100A, on the edge device paths map.

Thus, via the interaction illustrated in FIG. 2D, a system in accordance with an embodiment may generate the edge device paths map. Consequently, a deployment (e.g., 100) may be more likely to be able to provide desired computer implemented services by enumerating paths of API calls, based on a request, from an edge orchestrator (e.g., 104) through a distributed environment of edge devices (e.g., 100A, 100B, etc.).

Turning to FIG. 2E, a fifth interaction diagram in accordance with an embodiment is shown. The fifth interaction diagram may illustrate data used in and data processing performed in performing a health path identification.

To perform the health path identification, health path identification process 242 may be performed. During health path identification process 242, edge device health status map repository 214 may be queried. Edge device health status map repository 214 was described in the description of FIG. 2B. From edge device health status map repository 214, edge device health status map 212 may be obtained. Edge device health status map 212 was also described in the description of FIG. 2B. Edge device health status map 212 may be ingested during health path identification process 242.

Request participant edge device paths map 240 may also ingested during health path identification process 242. Request participant edge device paths map 240 may be an example of the edge device paths map that was generated following the description of FIG. 2D. Request participant edge device paths map 240 may include at least one path in a distributed environment of at least one edge device used in a fulfillment of a request.

During ingestion of edge device health status map 212 and request participant edge device paths map 240, at least one health state of at least one edge device on request participant edge device paths map 240 may be checked. If the at least one health state of the at least one edge device is described as unhealthy, then request participant edge device paths map 240 may be discarded. Otherwise, if a health state of the at least one edge device has a health state that is described as healthy, then request participant edge device paths map 240 may be added to healthy participant edge device paths map 244, shown in FIG. 2F.

The at least one health state of the at least one edge device on request participant edge device paths map 240 may be checked by matching the at least one edge device of edge device health status map 212 to the at least one edge device on request participant edge device paths map 240. The matching may be done by comparing device identifiers for the at least one edge device on edge device health status map 212 and request participant edge device paths map 240. Once a match is found between the device identifiers, a health state can be obtained from edge device health status map 212 for the at least one edge device with a matching device identifier.

Thus, via the interaction illustrated in FIG. 2E, a system in accordance with an embodiment may perform the health path identification. Consequently, a deployment (e.g., 100) may be more likely to be able to provide desired computer implemented services by obtaining at least one edge device paths map that includes edge devices with healthy health states.

Turning to FIG. 2F, a sixth interaction diagram in accordance with an embodiment is shown. The sixth interaction diagram may illustrate data used in and data processing performed in performing an application programming interface (API) call based on a request.

To perform the API call based on the request, edge device path selection process 246 may be performed. During edge device path selection process 246, healthy participant edge device paths map 244 may be ingested. Healthy participant edge device paths map 244 may include a list of at least one edge device that can (i) perform a service based on the request and (ii) has a healthy health state.

Upon ingestion of healthy participant edge device paths map 244, an edge device path map may be selected. An edge device path map may be selected choosing the edge device path map based attributes such as (i) performance (e.g., an ability of the at least one edge device to handle a data volume and speed associated with the request), (ii) failover and recovery (e.g. the ability of the at least one edge device to recover from a failure and maintain operation), (iii) data security (e.g., the ability of the at least one edge device to protect sensitive data associated with the request), etc.

Selected healthy edge device path 248 may be selected from healthy participant edge device paths map 244 based on inclusion of one or more of the attributes. Selected healthy edge device path 248 may then be ingested in application programming interface (API) call process 250.

During application programming interface (API) call process 250, selected healthy edge device path 248 may be used for performance of a service based on request 218. Selected healthy edge device path 248 may be used by performing an API call to a first edge device of selected healthy edge device path 248. The API call may be performed by issuing a command based on request 218 to be performed by the first edge device. The command may be run by the first edge device. During performance of the command, the first edge device may continue the API call on a second device of selected healthy edge device path 248. The API call may be continued on edge devices along a path map of selected healthy edge device path 248 for the performance of the service based on request 218.

Thus, via the interaction illustrated in FIG. 2F, a system in accordance with an embodiment may perform an application programming interface (API) call based on a request. Consequently, a deployment (e.g., 100) may be more likely to be able to provide desired computer implemented services by using at least one edge device of a healthy edge device path map to perform the service.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIG. 1 may perform various methods to manage data processing systems. FIG. 3 illustrates a method that may be performed by the components of the system of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of managing operation of a deployment in accordance with an embodiment is shown. The method may be performed, for example, by any of the components of the system of FIG. 1, and/or other components not shown therein.

At operation 300, a request may be obtained for performance of a service by edge devices of the deployment. The request may be obtained by receiving the request from a client. The client may include a user, application and/or device.

At operation 302, at least one path map may be attempted to be identified for the service. The at least one path map may be attempted to be identified by performing a search for a path map in a path map repository.

At operation 304, a new path map may be established for the service, in a first instance of the attempting where no path maps are available for the service. The new path map may be established by (i) performing the request, the request being passed to at least one edge device of the edge devices, the request including an instruction for the performance of the service and a trace identifier; (ii) obtaining a response from the trace identifier to identify the at least one edge device, and (iii) generating the new path map for the service using the identification of the at least one edge device.

The request may be performed by performing an application programming interface (API) call on the at least one edge device, the API call including a command to be performed by the at least one edge device and the trace identifier to report a device identifier of the at least one edge device. The command may include the instruction for the performance of the service.

The response may be obtained from the trace identifier by reporting the device identifier of the at least one edge device during performance of the service. The new path map may be generated by receiving the device identifier of the at least one edge device and generating, using the device identifier, a list of the at least one edge device on which the service was performed.

At operation 306, the at least one path map may be filtered using health states of the edge devices to obtain at least one filtered path map, in a second instance of the attempting where the at least one path map for the service is available. The at least one path map may be filtered by (i) checking, for an edge device of the at least one path map, whether the edge device of the at least one path map has an unhealthy health state of the health states, (ii) discarding the at least one path map, in the first instance of the checking where the edge device in the at least one path map has an unhealthy health state of the health states, and (iii) adding the edge device to a filtered path map of the at least one filtered path map, in the second instance of the checking where the edge device on the path does not have an unhealthy health state of the health states.

The edge device of the at least one path map may be checked by (i) obtaining the unique identifier of the edge device, (ii) using the unique identifier to locate the edge device in an edge device health status map, and (iii) obtaining a health state of the edge device from the edge device health status map. The at least one path map may be discarded by releasing memory associated with a data structure of the at least one path map. The edge device may be added to a filtered path map by including the device identifier of the edge device on the filtered path map.

At operation 308, one of the at least filtered path maps may be selected. One of the at least filtered path maps may be selected by (i) comparing performance of the edge devices between the at least one filtered path map and (ii) selecting one of the at least one filtered path maps that includes the edge devices that had a better performance.

At operation 310, performance of the service may be initiated by issuing a command based on the selected one of the at least one filtered path maps to provide a desired computer implemented service using the deployment. The performance of the service may be initiated by performing the API call on the at least one edge device of the one of the at least filtered path maps, the API call including a command to be performed by the at least one edge device.

The method may end following operation 310.

Thus, via the method shown in FIG. 3, embodiments herein may likely improve a likelihood of managing the operation of the deployment. By improving the likelihood of managing the operation of the deployment, the data processing systems may be more likely to provide desirable computer implemented services by, for example, selecting paths of edge devices in a distributed environment of edge devices for performance of a service, filtering the paths of the edge devices based on health states of the edge devices, etc.

Figure 4:
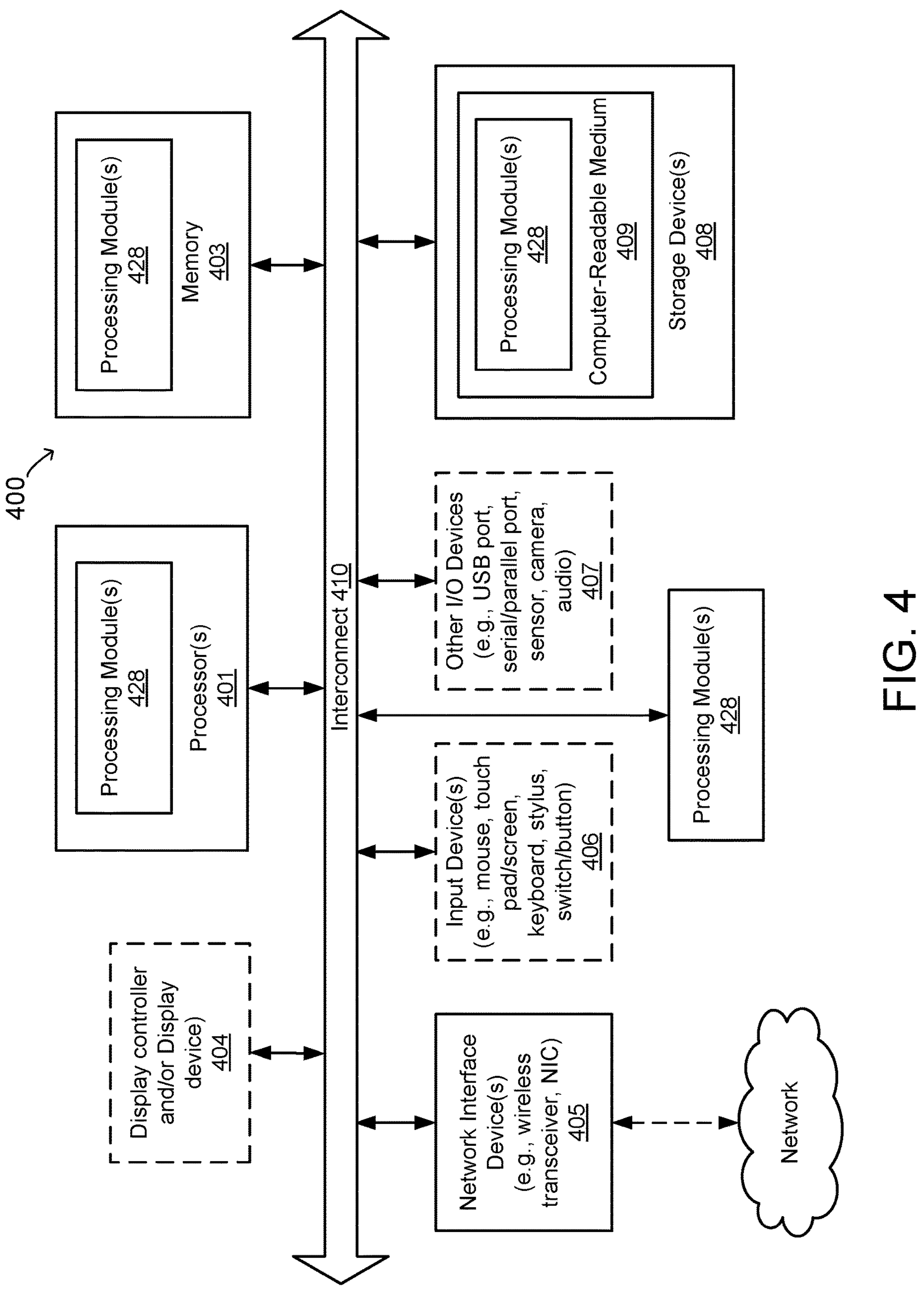
FIG. 4 shows a block diagram illustrating a data processing system in accordance with an embodiment.

Any of the components illustrated in FIGS. 1-2F may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term “machine” or “system” shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a deployment, the method comprising:

obtaining a request for performance of a service, the service being performed by edge devices of the deployment;

attempting to identify at least one path map for the service;

in a first instance of the attempting where no path maps are available for the service:

establishing a new path map for the service, wherein the establishing the new path map for the service comprises:

performing the request, the request being passed to at least one edge device of the edge devices, the request comprising an instruction for the performance of the service and further comprising a trace identifier;

obtaining a response from the trace identifier to identify the at least one edge device; and generating the new path map for the service using identification of the at least one edge device;

in a second instance of the attempting where the at least one path map for the service is available:

filtering the at least one path map using health states of the edge devices to obtain at least one filtered path map;

selecting one of the at least one filtered path maps; and initiating performance of the service by issuing a command based on the selected one of the at least one filtered path maps to provide a desired computer implemented service using the deployment.

2. The method of claim 1, further comprising:

obtaining a health state of the health states from an edge device of the edge devices.

3. The method of claim 1, wherein the attempting to identify the at least one path map for the service comprises:

performing a search in a repository for the at least one path map through which the command, based on the request, may be performed.

4. The method of claim 3, wherein the at least one path map is added to the repository after the at least one path map is established and the repository is used to store the at least one path map.

5. The method of claim 4, wherein the at least one path map identifies a set of edge devices that can participate in the command, from a first edge device to a second edge device, based on the request for performance of the service.

6. The method of claim 1, wherein the filtering the at least one path map using the health states of the edge devices comprises:

for an edge device of the at least one path map:

checking whether the edge device of the at least one path map has an unhealthy health state of the health states;

in the first instance of the checking where the edge device in the at least one path map has an unhealthy health state of the health states:

discarding the at least one path map; and in the second instance of the checking where the edge device on the path does not have an unhealthy health state of the health states:

adding the edge device to a filtered path map of the at least one filtered path map.

7. The method of claim 1, wherein a health state of the health states specifies an operational status of an edge device of the edge devices, the operational status being an indicator of performance and functionality of the edge device.

8. The method of claim 7, wherein the functionality of the edge device comprises at least one type of operation by the edge device to process the request.

9. The method of claim 8, wherein the performance of the edge device comprises how well the edge device can complete the at least one type of the operation to process the request.

10. The method of claim 1, wherein the command comprises at least one instruction to be completed by an edge device of the edge devices, the at least one instruction causing performance of the service on a distributed system, the at least one instruction being performed on the one of the at least one filtered path maps.

11. A non-transitory machine-readable medium having instructions stored therein, which when executed by a processor, cause the processor to perform operations for managing a deployment, the operations comprising:

obtaining a request for performance of a service, the service being performed by edge devices of the deployment;

attempting to identify at least one path map for the service;

in a first instance of the attempting where no path maps are available for the service:

establishing a new path map for the service, wherein the establishing the new path map for the service comprises:

performing the request, the request being passed to at least one edge device of the edge devices, the request comprising an instruction for the performance of the service and further comprising a trace identifier;

obtaining a response from the trace identifier to identify the at least one edge device; and generating the new path map for the service using identification of the at least one edge device;

in a second instance of the attempting where the at least one path map for the service is available:

filtering the at least one path map using health states of the edge devices to obtain at least one filtered path map;

selecting one of the at least one filtered path maps; and initiating performance of the service by issuing a command based on the selected one of the at least one filtered path maps to provide a desired computer implemented service using the deployment.

12. The non-transitory machine-readable medium of claim 11, wherein the operations further comprise:

obtaining a health state of the health states from an edge device of the edge devices.

13. The non-transitory machine-readable medium of claim 11, wherein the attempting to identify the at least one path map for the service comprises:

performing a search in a repository for the at least one path map through which the command, based on the request, may be performed.

14. The non-transitory machine-readable medium of claim 13, wherein the at least one path map is added to the repository after the at least one path map is established and the repository is used to store the at least one path map.

15. The non-transitory machine-readable medium of claim 14, wherein the at least one path map identifies a set of edge devices that can participate in the command, from a first edge device to a second edge device, based on the request for performance of the service.

16. A data processing system, comprising:

a processor; and a memory coupled to the processor to store instructions, which when executed by the processor, cause the processor to perform operations managing a deployment, the operations comprising:

obtaining a request for performance of a service, the service being performed by edge devices of the deployment;

attempting to identify at least one path map for the service;

in a first instance of the attempting where no path maps are available for the service:

establishing a new path map for the service, wherein the establishing the new path map for the service comprises:

performing the request, the request being passed to at least one edge device of the edge devices, the request comprising an instruction for the performance of the service and further comprising a trace identifier;

obtaining a response from the trace identifier to identify the at least one edge device; and generating the new path map for the service using identification of the at least one edge device;

in a second instance of the attempting where the at least one path map for the service is available:

filtering the at least one path map using health states of the edge devices to obtain at least one filtered path map;

selecting one of the at least one filtered path maps; and initiating performance of the service by issuing a command based on the selected one of the at least one filtered path maps to provide a desired computer implemented service using the deployment.

17. The data processing system of claim 16, wherein the operations further comprise:

obtaining a health state of the health states from an edge device of the edge devices.

18. The data processing system of claim 16, wherein the attempting to identify the at least one path map for the service comprises:

performing a search in a repository for the at least one path map through which the command, based on the request, may be performed.

19. The data processing system of claim 18, wherein the at least one path map is added to the repository after the at least one path map is established and the repository is used to store the at least one path map.

20. The data processing system of claim 19, wherein the at least one path map identifies a set of edge devices that can participate in the command, from a first edge device to a second edge device, based on the request for performance of the service.

* * * * *